(12) United States Patent
Patel et al.

(10) Patent No.: US 8,909,043 B2
(45) Date of Patent: Dec. 9, 2014

(54) ROUTING, WAVELENGTH ASSIGNMENT, AND SPECTRUM ALLOCATION IN WAVELENGTH CONVERTIBLE FLEXIBLE OPTICAL WAVELENGTH-DIVISION MULTIPLEXING NETWORKS

(75) Inventors: Ankitkumar N. Patel, E. Brunswick, NJ (US); Philip N. Ji, Princeton, NJ (US); Jason P. Jue, Plano, TX (US)

(73) Assignee: NEC Laboratories America, Inc., Princeton, NJ (US)

( * ) Notice: Subject to any disclaimer, the term of this patent is extended or adjusted under 35 U.S.C. 154(b) by 146 days.

(21) Appl. No.: 13/324,112

(22) Filed: Dec. 13, 2011

(65) Prior Publication Data
US 2012/0201541 A1 Aug. 9, 2012

Related U.S. Application Data

(60) Provisional application No. 61/439,401, filed on Feb. 4, 2011.

(51) Int. Cl.
*H04J 14/00* (2006.01)
*H04J 14/02* (2006.01)

(52) U.S. Cl.
CPC ......... *H04J 14/0257* (2013.01); *H04J 14/0212* (2013.01); *H04J 14/0217* (2013.01); *H04J 45/62* (2013.01); *H04J 14/0204* (2013.01); *H04J 14/0224* (2013.01); *H04J 14/026* (2013.01); *H04J 14/0267* (2013.01)
USPC ............................... 398/57; 398/58; 370/238

(58) Field of Classification Search
CPC .............. H04J 14/0212; H04J 14/0217; H04J 14/0257; H04J 14/0267; H04J 14/0204; H04J 14/0224; H04J 14/026; H04L 45/62
See application file for complete search history.

(56) References Cited

U.S. PATENT DOCUMENTS

2004/0208559 A1* 10/2004 Krishnaswamy et al. ...... 398/59
2012/0140636 A1*  6/2012 Resende et al. ............... 370/238

OTHER PUBLICATIONS

Chlamtac et al., "Lightpath (Wavelength) Routing in Large WDM Networks," Journal of Selected Areas in Communications, vol. 14, No. 5, pp. 909-913, Jun. 1996.
Jaekel et al., "Routing and Wavelength Assignment in Optical Mesh Networks with Wavelength Conversion", Performance, Computing, and Communications Conference, 2006. IPCCC 2006. 25th IEEE International, pp. 280-288, Apr. 2006.
Lee et al., "A Wavelength-Convertible Optical Network," Journal of Lightwave Technology, vol. 11, No. 56, pp. 962-970, Jun. 1993.

(Continued)

*Primary Examiner* — Ken Vanderpuye
*Assistant Examiner* — David Lambert
(74) *Attorney, Agent, or Firm* — Joseph Kolodka (57) ABSTRACT

There is provided a method in a wavelength convertible flexible optical wavelength-division multiplexing (WC-FWDM) network. The network has a plurality of optical nodes interconnected by a plurality of optical fibers. The network is for providing an overall spectrum divisible into a set of consecutive wavelength slots. At least one optical node has at least one wavelength converter for wavelength conversion. The method includes determining a channel route through the network commencing at a source node and ceasing at a destination node. The determined channel route is selectively tunable responsive to selected ones of a plurality of routing methods. The routing methods are so selected responsive to a routing policy having one or more objectives of minimization of channel blocking, minimization of a number of wavelength converters used in the network, and minimization of physical distance traversed by a channel, and minimization of operating wavelengths of a channel.

10 Claims, 8 Drawing Sheets

(56) References Cited

OTHER PUBLICATIONS

Patel et al., "Routing, Wavelength Assignment, and Spectrum Allocation in Transparent Flexible Optical WDM (FWDM) Networks," Proceeding of OSA Photonics in Switching, PDPWG1, Jul. 2010. (3 pages).

Patel et al., "Dynamic Routing, Wavelength Assignment, and Spectrum Allocation in Transparent Flexible Optical WDM Networks," Proceeding of SPIE OPTO, No. 7959-21, Jan. 2011. (8 pages).

* cited by examiner

ROUTING, WAVELENGTH ASSIGNMENT, AND SPECTRUM ALLOCATION IN WAVELENGTH CONVERTIBLE FLEXIBLE OPTICAL WAVELENGTH-DIVISION MULTIPLEXING NETWORKS

RELATED APPLICATION INFORMATION

This application claims priority to provisional application Ser. No. 61/439,401 filed on Feb. 4, 2011, incorporated herein by reference.

BACKGROUND

1. Technical Field

The present invention relates to wavelength-division multiplexing (WDM), and more particularly to routing, wavelength assignment, and spectrum allocation in wavelength convertible flexible optical WDM networks.

2. Description of the Related Art

Figure 1:
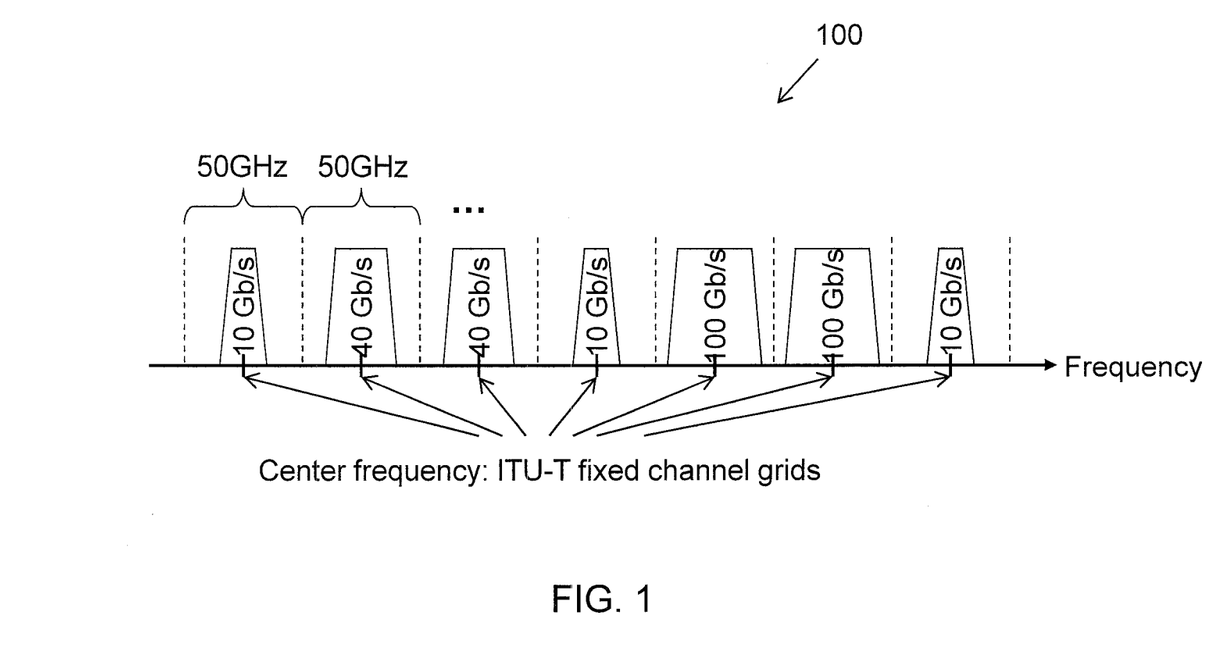
FIG. 1 shows the fixed channel spacing 100 of a fixed grid wavelength-division multiplexing (WDM) network.

In International Telecommunication Union, Telecommunication Sector (ITU-T) standardized fixed grid networks, a fixed amount of spectrum (50 GHz) is allocated to every channel irrespective of the operating line rate, and the center frequency of a channel remains fixed. FIG. 1 shows the fixed channel spacing 100 of a fixed grid wavelength-division multiplexing (WDM) network. Such a fixed channel grid may not be sufficient to support immerging super-channels which operates at 400 Gb/s or 1 Tb/s line rates. For example, 50 GHz of spectrum is not sufficient for 400 Gb/s and 1 Tb/s channels which require 75 GHz and 150 GHz of spectrum, respectively. On the other hand, supporting such super-channels by increasing the channel spacing in fixed grid networks may not optimize the spectrum allocation for channels operating at lower line rates. For example, a 10 Gb/s channel only requires 25 GHz of spectrum. Thus, no single fixed channel grid is optimal for all line rates.

Figure 2:
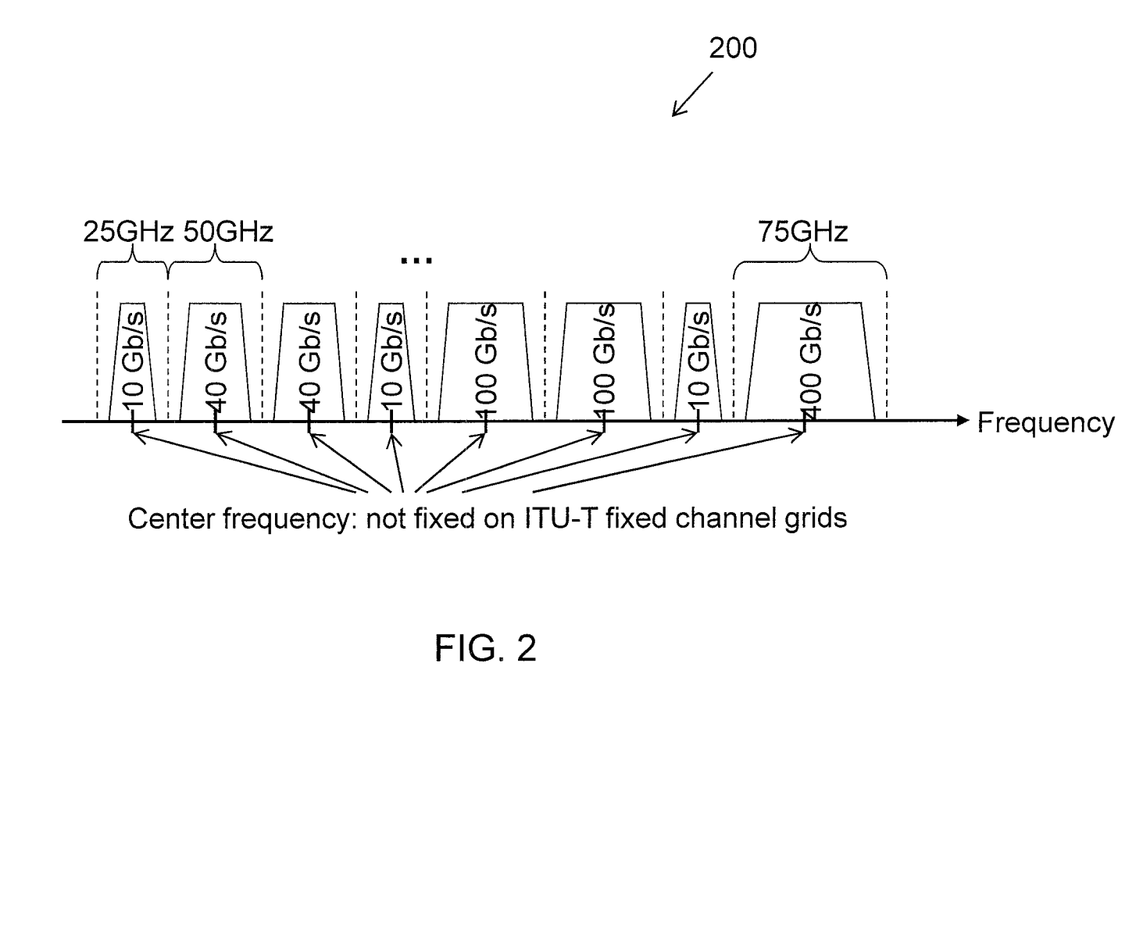
FIG. 2 shows the flexible channel spacing 200 of a flexible optical wavelength-division multiplexing network (FWDM)

There has been growing research on optical WDM systems that is not limited to a fixed ITU-T channel grid, but offers a flexible channel grid to increase spectral efficiency. We refer to such grid-less WDM networks as flexible optical WDM networks (FWDM). In FWDM networks, a flexible amount of spectrum is allocated to each channel, and the channel center frequency may not be fixed. FIG. 2 shows the flexible channel spacing 200 of a flexible optical wavelength-division multiplexing network (FWDM). Thus, while establishing a channel in FWDM networks, a control plane must follow (1) the requirement of having the same operating wavelength on all fibers along the route of a channel which is referred to as the wavelength continuity constraint, (2) the requirement of allocating the same amount of spectrum on all fibers along the route of a channel which is referred to as the spectral continuity constraint, and (3) the requirement of allocating non-overlapping spectrum with the neighboring channels in the fiber which is referred to as the spectral conflict constraint. The problem of finding a channel satisfying these constraints is referred to as the routing, wavelength assignment, and spectrum allocation (RWSA) problem.

Due to wavelength continuity, spectral continuity, and spectral conflict constraints, a channel may not be established even though there is sufficient amount of spectrum available on all fibers along the route. Wavelength and spectral conflicts between different fibers can be resolved by employing wavelength converters at nodes which can convert the wavelength on the incoming fiber to an available wavelength on the outgoing fiber at which sufficient spectrum is available. Thus, wavelength converters can improve the channel blocking probability. FWDM networks with wavelength converters are referred to as wavelength convertible FWDM networks.

One of the open problems in wavelength convertible FWDM networks is as follows: for a given configuration of the optical network in terms of the location of optical nodes and deployed fibers connecting optical nodes, the number of wavelength converters at each optical node, the wavelength conversion range of each wavelength converter, the set of line rates offered by the network and the respective spectrum requirement, the problem is how to find a channel operating at the requested line rate in the wavelength convertible FWDM network such that the blocking probability of a channel is minimized. Finding a channel in FWDM networks involves sub-problems such as how to route the channel, how to assign a wavelength to the channel, and how to allocate the required spectrum to the channel. Together the problem is referred to as the routing, wavelength assignment, and spectrum allocation in wavelength convertible FWDM networks (RWSA-WC).

If we restrict the spectrum allocation to every channel to be fixed, then the problem is transformed into the routing and wavelength assignment (RWA-WC) problem in wavelength convertible fixed grid networks. However, existing methods directed to the RWA-WC problem are not applicable to the RWSA-WC problem due to the additional spectral continuity and spectral conflict constraints.

Existing solutions of the RWSA problem are applicable to the RWSA-WC problem. However, existing RWSA solutions suffer from higher blocking probability because these solutions are not able to take advantage of wavelength converters. Accordingly, there is no existing solution addressing the RWSA-WC problem in FWDM networks.

SUMMARY

These and other drawbacks and disadvantages of the prior art are addressed by the present principles, which are directed to routing, wavelength assignment, and spectrum allocation in wavelength convertible flexible optical wavelength-division multiplexing (WDM) networks.

According to an aspect of the present principles, there is provided a method in a wavelength convertible flexible optical wavelength-division multiplexing (WC-FWDM) network. The network has a plurality of optical nodes interconnected by a plurality of optical fibers. The network is for providing an overall spectrum divisible into a set of consecutive wavelength slots. At least one of the plurality of optical nodes has at least one wavelength converter for wavelength conversion. The method includes determining a channel route through the network commencing at a source node and ceasing at a destination node. The determined channel route is selectively tunable responsive to selected ones of a plurality of routing methods. The selected ones of the plurality of routing methods are so selected responsive to a routing policy having one or more objectives of minimization of a blocking of one of more channels in the set, minimization of a number of wavelength converters used in the network, minimization of physical distance traversed by a channel between a source node and a destination node, and minimization of operating wavelengths of a channel.

According to another aspect of the present principles, there is provided a method in a wavelength convertible flexible optical wavelength-division multiplexing (WC-FWDM) network. The network has a set of optical nodes interconnected by a set of optical fibers. The network is for providing an overall spectrum divisible into a set of consecutive wavelength slots. At least one of the optical nodes in the set has at least one wavelength converter for wavelength conversion. The method includes constructing an auxiliary graph having a set of auxiliary nodes. Each of the auxiliary nodes corresponds to a respective one of the optical nodes in the set of optical nodes. The auxiliary graph further has a set of auxiliary links. Each of the auxiliary links corresponds to a respective one of the optical fibers in the set of optical fibers. The method further includes determining a subset of auxiliary links that support an amount of the spectrum specified for a given channel. The method additionally includes searching the subset of auxiliary links to select one or more auxiliary links in the subset that minimize a channel blocking probability.

According to yet another aspect of the present principles, there is provided a method in a wavelength convertible flexible optical wavelength-division multiplexing (WC-FWDM) network. The network has a plurality of optical nodes interconnected by a plurality of optical fibers. The network is for providing an overall spectrum divisible into a set of consecutive wavelength slots. At least one of the plurality of optical nodes has at least one wavelength converter for wavelength conversion. The method includes performing an incremental search on a subset of consecutive wavelength slots in the set starting at a given slot in the subset having a lowest wavelength corresponding thereto. The method further includes terminating the incremental search when a particular one of the consecutive wavelength slots in the subset is available on each of the plurality of nodes. The method additionally includes establishing a channel using the particular one of the consecutive wavelength slots. The establishing step includes determining a route for the channel by selecting a node along the route from among multiple candidate nodes responsive to node parameters and respective priorities of the node parameters.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

As noted above, the present principles are directed to routing, wavelength assignment, and spectrum allocation in wavelength convertible flexible optical wavelength-division multiplexing (WC-FWDM) networks. Advantageously, the present principles address and overcome the aforementioned routing, wavelength assignment, and spectrum allocation in WC-FWDM networks (RWSA-WC) problem.

In an embodiment, the present principles address routing, wavelength assignment, and spectrum allocation sub-problems at the same time using an auxiliary graph based method. Additionally, the solution for the routing sub-problem is tunable to various methods. Thus, the proposed approach may be interchangeable referred to herein as the tunable routing, wavelength assignment, and spectrum allocation approach.

Again referring to existing solutions to the routing, wavelength assignment, and spectrum allocation (RWSA) problem, as noted above, the same may still block connections due to the wavelength continuity, spectral continuity and spectral conflict constraints. To increase efficiency, in an embodiment, we propose a wavelength-convertible FWDM network (WC-FWDM) in which wavelength converters are employed at intermediate switching ROADM nodes. Of course, the present principles are not limited to ROADM nodes and, hence, other types of optical nodes may also be used as readily contemplated by one of ordinary skill in the art given the teachings of the present principles provided herein, while maintaining the spirit of the present principles. A wavelength converter can change the wavelength of a transit connection from any incoming wavelength to any arbitrary wavelength. Thus, wavelength conflicts along the route of a channel can be resolved, and utilization of spectral resources can be increased.

Figure 3:
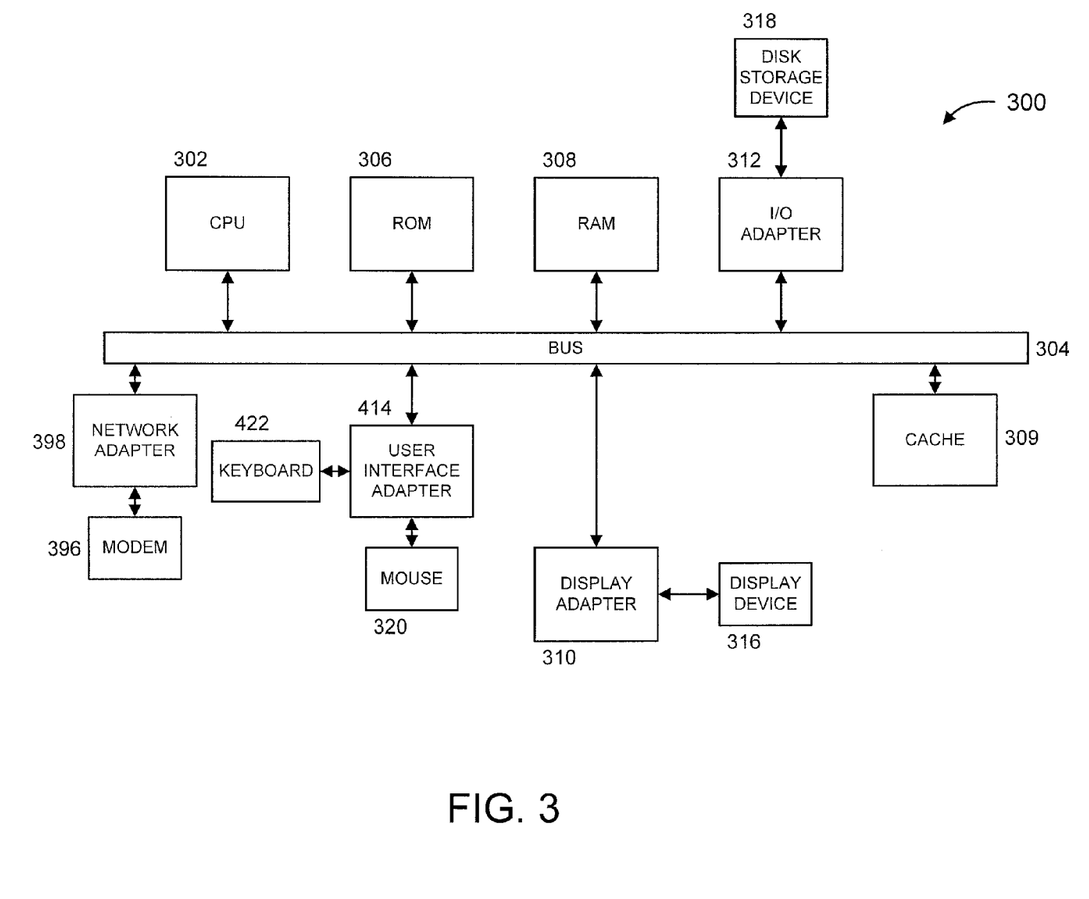
FIG. 3 is a block diagram illustrating an exemplary processing system 300 to which the present principles may be applied, according to an embodiment of the present principles.

Referring now in detail to the figures in which like numerals represent the same or similar elements and initially to FIG. 3, a block diagram illustrating an exemplary processing system 300 to which the present principles may be applied, according to an embodiment of the present principles, is shown. Such a processing system 300 may be used to implement various methods in accordance with the present principles. The processing system 300 includes at least one processor (CPU) 302 operatively coupled to other components via a system bus 304. A read only memory (ROM) 306, a random access memory (RAM) 308, a display adapter 310, an I/O adapter 312, a user interface adapter 314, and a network adapter 398, are operatively coupled to the system bus 304.

A display device 316 is operatively coupled to system bus 304 by display adapter 310. A disk storage device (e.g., a magnetic or optical disk storage device) 318 is operatively coupled to system bus 304 by I/O adapter 312.

A mouse 320 and keyboard 322 are operatively coupled to system bus 304 by user interface adapter 314. The mouse 320 and keyboard 322 are used to input and output information to and from system 300.

A (digital and/or analog) modem 396 is operatively coupled to system bus 304 by network adapter 398.

Of course, the processing system 300 may also include other elements (not shown), as readily contemplated by one of skill in the art.

WC-FWDM Network Architecture

The WC-FWDM network architecture includes the following four key features: (1) dynamic allocation of network resources; (2) dynamic provisioning of connections; (3) an automated control plane; and (4) wavelength conversion capability.

Resource allocation in the WC-FWDM network is flexible and dynamic. The WC-FWDM architecture can establish channels operating at the requested data rates, and thus, minimizes stranded channel capacity in the network. Additionally, these channels are established by allocating an optimum amount of spectrum using advance modulation schemes.

Such channels are referred to as flexible channels. Thus, the WC-FWDM network architecture increases spectral utilization of the network. Flexible channels in WC-FWDM networks may be static or may be adaptive to dynamic traffic. The line rate and spectrum of an adaptive channel can be changed over time to support time varying traffic demands. Such flexible adaptive channels can be realized using variable rate transponders, which can use an OFDM based modulation scheme with variable subcarrier assignment or use a single carrier modulation scheme with switchable modulation stages and variable rate data multiplexer to adjust the line rate according to traffic demand.

The WC-FWDM architecture provides dynamic provisioning of connections through spectrum-variable colorless, directionless, and contentionless multi-degree ROADM nodes. Similar to fixed grid networks, the multi-degree ROADM nodes have colorless and directionless features so that adding/dropping of connections are not restricted to a specific wavelength or transponder, and the connections can be flexibly routed to any direction. Furthermore, both of these features are achieved without incurring wavelength contention at nodes by using optical demultiplexers with large scale fiber switches, or wavelength-selective switch (WSS)-based ROADM sub-modules with wavelength aggregators. In the FWDM network, the demultiplexers and WSS's are spectrum-variable by using switching technologies with small pixels, such a liquid crystal on silicon (LCoS) or digital micro electro mechanical systems (MEMS), to obtain finer switching granularity and to perform adding/dropping/cross-connecting with different passband widths.

Channels in a WC-FWDM network can be set up, torn down, and managed by an automated control plane in which an existing generalize multi-protocol label switching (GM-PLS) control plane is modified by incorporating channel width and operating frequency related parameters or establishing channels (lambda paths) at a subcarrier granularity.

Figure 5:
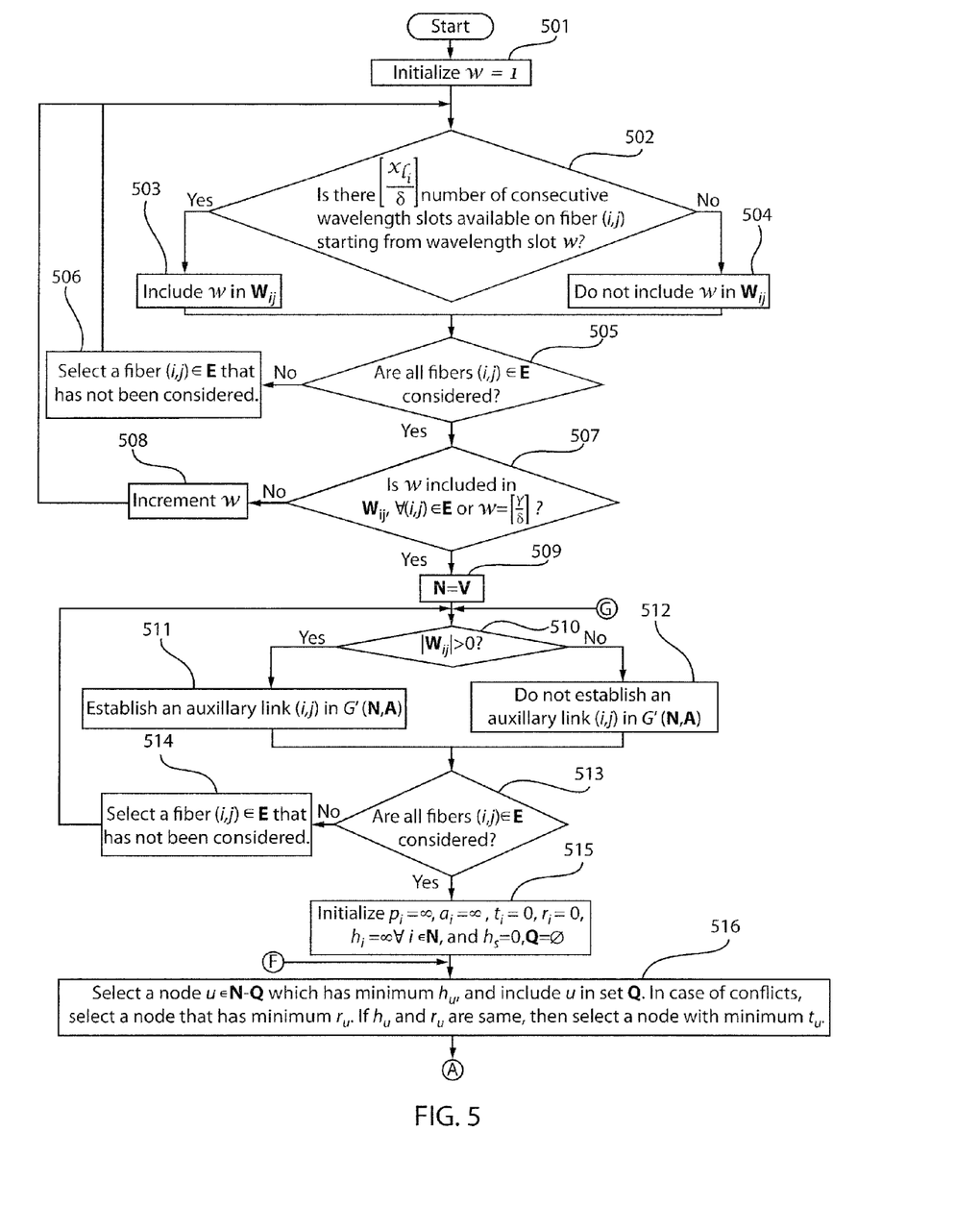
FIG. 5 is a flow diagram showing an exemplary method for tunable routing, wavelength assignment, and spectrum allocation in a WC-FWDM network, according to an embodiment of the present principles.

The wavelength conversion function of the FWDM network is also performed in the ROADM node. There are several options for positioning wavelength converters in the ROADM node, as illustrated in the example of FIG. 5.

Figure 4:
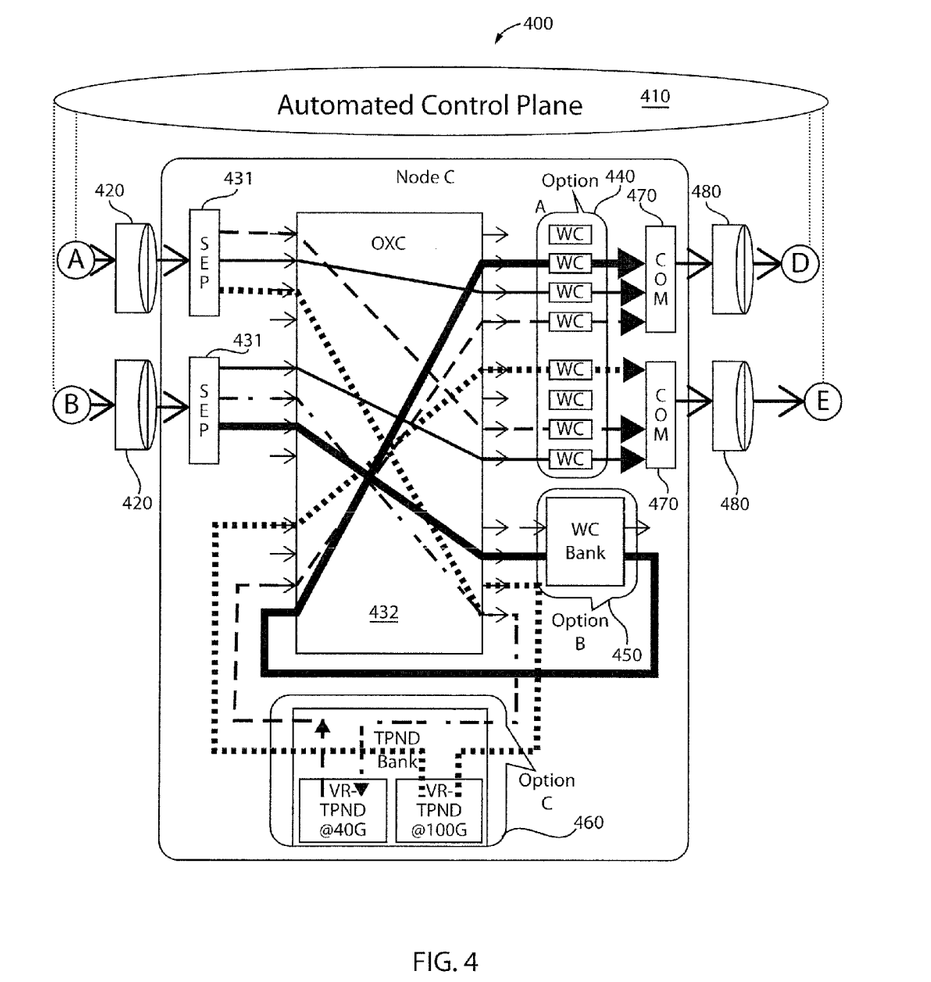
FIG. 4 shows a wavelength convertible flexible optical wavelength-division multiplexing (WC-FWDM) network architecture 400, in accordance with an embodiment of the present principles.

FIG. 4 shows a wavelength convertible flexible optical wavelength-division multiplexing (WC-FWDM) network architecture 400, in accordance with an embodiment of the present principles. The WC-FWDM network architecture 400 includes an automated control plane 410, incoming optical fibers 420, separators (seps) 431, a fiber cross-connect (OXC) 432, a bank 440 of wavelength converters with full-wavelength conversion capability, a bank 450 of wavelength converters with sparse wavelength conversion capability, a bank 460 of transponders, and outgoing optical fibers 480.

In the example of FIG. 4, the FWDM optical signals from the incoming fibers 420 are first demultiplexed using FWDM channel separators 431. A separator 431 can be realized by using a spectrum variable wavelength selectable switch (WSS). Each separated wavelength is switched to its respective output port using a fiber cross-connect 432. Each output port of the fiber cross-connect 432 includes a dedicated wavelength converter (440, 450, and/or 460, so that the wavelength at the output port may be changed dynamically. Finally an optical combiner 470 is used to multiplex the FWDM channels onto each outgoing optical fiber 480. The combiner 470 can be realized by using a passive optical coupler.

If d is the outbound degree of a node, Y is the total optical spectrum, and l is the minimum required spectrum by a channel, then the WC-FWDM architecture requires $$d\left\lceil \frac{Y}{l} \right\rceil$$

wavelength converters. This architecture is referred to as WC-FWDM with full wavelength conversion capability (Option A, i.e., 440 in FIG. 4).

In the case of availability of the same wavelength at the outbound fiber 470 as at the inbound fiber 420, a transit connection does not require a wavelength converter. Thus, full wavelength conversion may not be a cost efficient approach. An alternative solution is to use a wavelength converter bank 450 in which wavelength converters are shared between transit connections over time. The connections that need wavelength conversion are switched by the fiber cross-connect 432 to a wavelength converter in the bank 450 instead of switching them to output ports, and after wavelength conversion, these connections are sent back to input ports of the fiber cross-connect 432 which switches them to the appropriate output ports. This architecture is referred to as WC-FWDM with sparse wavelength conversion (Option B, i.e., 450 in FIG. 4). Sparse wavelength conversion can be provided by using a limited number of converters at each node, or wavelength converters with limited range conversion capability, or a few nodes with wavelength conversion capability.

Another alternative is to drop the channels that require wavelength conversion at the node and to use back-to-back transponders 460 to change the wavelengths before adding them back to the node (Option C, i.e., 460 in FIG. 4).

Wavelength conversion using back-to-back connection of a transponder pair requires O-E-O conversion which affects the transparency of the signal and creates bottlenecks in the transmission speed. Additionally this technique is not power efficient. Optical wavelength conversion can be realized using techniques such as optical gating and wave-mixing. In particular, the wave mixing techniques, such as four-wave mixing using semiconductor amplifiers and difference frequency generation in periodically poled $LiNbO_3$ waveguides and semiconductor waveguides, allow transparency of the signals and allow the simultaneous conversion of multiple channels.

RWSA-WC

Given the WC-FWDM network, total optical spectrum, and arrival and connection holding time distributions of traffic demands, the problem is how to accommodate each traffic demand in the network such that connection blocking probability is minimized. The problem is referred to as the routing, wavelength assignment, and spectrum allocation problem in wavelength convertible FWDM networks (RWSA-WC). If the given network is a fixed grid network, then the problem is transformed into the routing and wavelength assignment problem with wavelength conversion (RWA-WC). The RWSA-WC problem considers allocation of an additional parameter, spectrum, as compared to the existing RWA-WC problem in fixed grid networks. The RWSA-WC problem can formally be defined as follows.

We are given a physical topology G(V,E), where V is a set of optical nodes (e.g., but not limited to ROADM nodes) and E is a set of fibers connecting the optical nodes. Each node i includes a number $C_i$ wavelength converters. The total network spectrum is Y GHz. The conversion range of a wavelength converter is ±M GHz. That means a wavelength converter is capable of converting an input wavelength w to any wavelength within (w−M) and (w+M). For example, M=Y indicates that an incoming wavelength can be converted to any outgoing wavelength. The WC-FWDM network supports a set of line rates L. For example, L={10 Gb/s, 40 Gb/s, 100 Gb/s, 400 Gb/s, 1 Tb/s}. A traffic demand requesting a connection between source s and destination d operating at line rate $l_i \in L$ is denoted as $R(s,d,l_i)$. Arrival and connection holding time distributions of traffic demands are given. Each line rate $l_i \in L$ requires a spectral width of $x_{l_i}$ GHz. For example, 100 Gb/s line rate requires 50 GHz of spectrum. We assume that the transponders are tunable. The goal of the problem is to find a set of lightpaths for traffic demands such that the connection blocking probability is minimized. For each lightpath, we must find the route of a lightpath over the physical topology, assign a wavelength, and allocate sufficient amount of spectrum to support the requested line rate. We assume that the transponders are wavelength tunable, and the optical network is ideal.

Routing, Wavelength Assignment, and Spectrum Allocation Method for WC-FWDM Networks We prove the hardness of the RWSA-WC problem by mapping it to the well known RWA problem in fixed grid networks, we describe the proposed method, and we evaluate the complexity of the proposed heuristic.

Theorem 1: The RWSA-WC problem is NP-Complete.

Proof If we restrict the number of converters at each node to be zero, $C_i=0$, then the RWSA-WC problem is transformed into the RWSA problem in the FWDM network. For a given identical spectral width of each line rate, $x_{l_i}=x_{l_j}, \forall i,j$, the RWSA problem in the FWDM network is transformed into the RWA problem in the mixed line rate fixed grid networks, and finally for the offered single line rate, $|L|=1$, the RWA problem in mixed line rate systems is reduced to the RWA problem in single line rate fixed grid WDM networks. Since the RWA problem, which is the constrained version of the RWSA-WC problem, is an NP-Complete problem, the RWSA-WC problem is also an NP-Complete problem.

We propose the first practical solution of the RWSA-WC problem referred to as the routing, wavelength assignment, and spectrum allocation method. In order to reduce the complexity of the problem, we assume that the spectrum is slotted in the frequency domain. Each slot is referred as a wavelength slot, and has a spectral width of $\delta$ GHz. The index of a wavelength slot is denoted as $$w \in \left\{1, 2, 3, \ldots \left\lceil \frac{Y}{\delta} \right\rceil\right\}.$$

The spectrum can also be defined in terms of the number of consecutive wavelength slots. The lowest index of the allocated wavelength slots to a channel is referred to as the wavelength of the channel. In a fiber, a wavelength slot can either be in an occupied state or be in an available state. The state information of a wavelength slot w in a fiber (i,j) is referred to as the spectrum availability information, which is denoted as $G_{ij}^w \in \{0,1\}$. $G_{ij}^w=1$ indicates that a wavelength slot w is available and $G_{ij}^w=0$ indicates that a wavelength slot w is occupied by a channel.

In an embodiment, the proposed method can be implemented using an auxiliary graph based approach. Of course, given the teachings of the present principles provided herein, the method can be readily constructed and/or otherwise modified into other forms while maintaining the spirit of the present principles. The following pseudo code of METHOD 1 is used to find a set of available wavelength slots and to construct an auxiliary graph.

METHOD 1: RWSA-WC (G(V,E), $C_i$, $H_{sd}$, R(s, d, $l_i$), $x_{li}$)

comment: Find a set of available wavelength slots for w ← 0 to $\left\lceil \frac{Y}{\delta} \right\rceil$ do $\begin{cases} \text{for} \forall (i, j) \in E \begin{cases} \text{it} \leftarrow 1 \\ \text{for } k \leftarrow 0 \text{ to } \left\lceil \frac{x_{l_i}}{\delta} \right\rceil \\ \text{do} \begin{cases} \text{if } G_{ij}^{w+k} \times \text{it} = 1 \\ \text{then it} \leftarrow 1 \\ \text{else it} \leftarrow 0 \end{cases} \\ \text{if it} = 1 \\ \text{then } W_{ij} \leftarrow W_{ij} \cup \{w\} \end{cases} \\ \text{for} \forall (i, j) \in E \begin{cases} \text{if } w \in W_{ij} \\ \text{then exit} \end{cases} \end{cases}$ done = false repeat $\begin{cases} \text{comment Construction of an auxiliary graph} \\ N = V \\ \text{for} \forall (i, j) \in E \begin{cases} \text{if}|W_{ij}| > 0 \\ \text{then}(i, j) \in A \end{cases} \\ \{\text{PATH, WL}\} = \text{Method2}(G'(N, A), R(s, d, l_i), H_{sd}, \rho, M) \\ \text{if}|\text{PATH}| \leq f(\rho, H_{sd}) \\ \text{then done} = \text{true} \\ \text{else } W_{ij} \leftarrow W_{ij} - \{\min(w) \mid w \in W_{ij}, \forall (i, j) \in E\} \\ \text{comment Remove the minimum wavelength slot from all sets} \end{cases}$ until done = false and $|w_{ij}| = 0, \forall(i, j) \in EA$ if done=true then return (PATH, WL)

else Block the Request

The pseudocode of METHOD 1 first finds a set of wavelength slots $W_{ij}$ starting from which $$\left\lceil \frac{x_{l_i}}{\delta} \right\rceil$$

consecutive wavelength slots are available in the spectrum availability information $G_{ij}^w$ of each link $(i,j) \in E$. The search of these wavelength slots is started from the lowest wavelength slot, and terminated when a wavelength slot w is available on every link $(i,j)$, $w \in W_{ij}$, $\forall (i,j) \in E$. In the second step, based n the found sets of wavelength slots, the method constructs an auxiliary graph G'(N,A), where N represents a set of auxiliary nodes and A represents a set of auxiliary links. A set of auxiliary nodes N is the same as the set of physical (i.e., optical) nodes V. An auxiliary link (i,j) is established if at least one wavelength slot is available on the fiber (i,j), $W_{ij} \neq \emptyset$, that is if the set of wavelength slots $W_{ij}$ is not empty.

After constructing an auxiliary graph, a route connecting source and destination nodes are found as follows according to the pseudo code of METHOD 2.

METHOD 2: ($\dot{G}$ (N, A), R (s, d, $l_i$), $H_{sd}$, ρ, M)

```
comment: Initialization of node parameters
for ∀i ∈ N{p_i ← ∞, a_i ← ∞, t_i ← 0, r_i ← 0, h_i ← ∞
h_s ← 0
Q ← φ
repeat
    ⎧ comment: Select a node based on priority
    ⎪ u ← {i | (1)min(h_i), (2)min(r_i), (3)min(t_i), ∀ i ∈ (N − Q)}
    ⎨ Q ← Q ∪ {u}
    ⎪         ⎧ comment: Update the node parameters of neighboring nodes
    ⎪         ⎪ if u = s
    ⎪         ⎪        ⎧ if h_u + 1 < h_j
    ⎪         ⎪   then ⎨      ⎧ Update( )
    ⎪         ⎪        ⎩ then ⎨
    ⎪         ⎪               ⎩ r_j ← 0
    ⎪         ⎪ if a_u = {min(w) | w ∈ W_uj}
    ⎪         ⎪        ⎧ if h_u + 1 < h_j
    ⎪         ⎪        ⎪        ⎧ Update( )
    ⎪         ⎪        ⎪   then ⎨
    ⎪         ⎪        ⎪        ⎩ r_j ← r_u
    ⎪         ⎪        ⎪ else if h_u + 1 = h_j
    ⎪         ⎪        ⎪        ⎧ if r_u < r_j
    ⎪         ⎪   then ⎨        ⎪        ⎧ Update( )
    ⎪         ⎪        ⎪   then ⎨   then ⎨
    ⎪         ⎪        ⎪        ⎪        ⎩ r_j ← r_u
    ⎪         ⎪        ⎪   then ⎨ else if r_u = r_j
    ⎪         ⎪        ⎪                 ⎧ if max(t_u, {min(w) | w ∈ W_uj}) < t_j
    ⎨         ⎨        ⎩            then ⎨      ⎧ Update( )
    ⎪ for ∀ j ∈ Adj(u) and j ∉ Q           ⎩ then ⎨
    ⎪         ⎪ else                              ⎩ r_j ← r_u
    ⎪         ⎪ else if a_u − M ≤ {min(w) | W_uj} ≤ a_u + M and C_u > 0
    ⎪         ⎪        ⎧ if h_u + 1 < h_j
    ⎪         ⎪        ⎪        ⎧ Update( )
    ⎪         ⎪        ⎪   then ⎨
    ⎪         ⎪        ⎪        ⎩ r_j ← r_u + 1
    ⎪         ⎪        ⎪ else if h_u + 1 = h_j
    ⎪         ⎪        ⎪        ⎧ if r_u + 1 < r_j
    ⎪         ⎪   then ⎨        ⎪        ⎧ Update( )
    ⎪         ⎪        ⎪   then ⎨   then ⎨
    ⎪         ⎪        ⎪        ⎪        ⎩ r_j ← r_u + 1
    ⎪         ⎪        ⎪   then ⎨ else if r_u + 1 = r_j
    ⎪         ⎪        ⎪                 ⎧ if max(t_u, {min(w) | w ∈ W_uj}) < t_j
    ⎩         ⎩        ⎩            then ⎨      ⎧ Update( )
                                           ⎩ then ⎨
                                                  ⎩ r_j ← r_u + 1
until (N − Q) ≠ φ
comment: Obtain routing, wavelength assignment information
u ← d
repeat
    PATH ← PATH ∪ {p_u}
    WL ← WL ∪ {a_u}
    u ← p_u
until u ≠ ∞
```

One node at a time is added to the covered set of nodes based on the physical distance of a node from the source node, the number of wavelength converters required to reach a node from the source node, and the maximum available wavelength along a route connecting a node to the source node. The method starts with Q as a set of visited nodes. Initially, Q is an empty set. For each node u∈N, five pieces of information (referred to herein as node parameters) are maintained, physical distance in terms of number of hops $h_u$ from the source node, wavelength at the input port $a_u$, maximum wavelength along the route from the source node $t_u$, the number of required wavelength converters along the route from the source node $r_u$, and predecessor node $p_u$. Initially, $a_u=\infty$, $t_u=0$, $r_u=0$, and $p_u=\infty$ for all u∈N, $h_u=\infty$ for all u∈N−{s}, and $h_s=0$.

The method repeatedly selects a vertex u from the set N−Q, which has the lowest physical distance $h_u$, and adds this node to set Q. In case of a tie, a node with the minimum number of converters $r_u$ along the route from the source node is selected. If the physical distance $h_u$ and the number of required wavelength converters $r_u$ are the same, then the tie is resolved by selecting a node with the minimum wavelength along the route $t_u$ along the route from the source node.

In the next step, the method updates the node parameters of adjacent nodes j∈Adj(u), j∉Q, where Adj(u) represents a set of adjacent nodes of node u. The node parameters of a neighboring node are only updated if the neighboring node is either reached with the wavelength continuity constraint or in case of wavelength conflicts, node u has sufficient number of wavelength converters and the wavelength at the input port is convertible to an available wavelength at the output port. If any node parameter of the neighboring node is improved, then based on a priority of a parameter, all other parameters are updated. In an embodiment, the first priority is given to the physical distance $h_j$. If $h_j$ is improved, then all other parameters are updated. In the case of a tie, in an embodiment, the second priority is given to the required number of wavelength converters $r_j$. Hence, the node parameters are updated if the number of employed converters along the route $r_j$ is improved. In the case of having the same physical distance $h_j$ and the same number of required wavelength converters $r_j$, then in an embodiment the third priority is given to the minimum available wavelength $t_j$.

The same procedure is repeated until N−Q=ø. At last, the predecessor information $p_u$ includes the routing information, the wavelength at the input port $a_u$ includes the wavelength assignment information, and $$\left\lceil \frac{x_{l_i}}{\delta} \right\rceil$$

is the spectrum allocation information. Thus, the proposed method solves the routing, wavelength assignment, and spectrum allocation subproblems at the same time and improves the network optimization.

The found RWSA solution is only acceptable if it satisfies certain criteria based on the route length, the number of converters, and the set of wavelengths along the route. Here, the method accepts the solution if the route length is less than $f(\rho, H_{sd})$, which represents the acceptable route length as a function of network load $\rho$ and the shortest physical distance between source and destination nodes $H_{sd}$.

$$f(,\rho, H_{sd}) = H_{sd} \quad (1)$$

$$f(\rho, H_{sd}) = H_{sd} + \infty \quad (2)$$

$$f(\rho, H_{sd}) = H_{sd} + ((1-\rho) \times H_{sd}) \quad (3)$$

$$f(\rho, H_{sd}) = H_{sd} + (10^{-\rho} \times H_{sd}) \quad (4)$$

The function in Equation (1) restricts the routing of traffic demands on the physical shortest paths, which is referred to as shortest path approach, while the function in Equation (2) does not restrict the length of a route. Thus, the routing of a traffic demand adapts based on the current network state, and greedily selects the shortest route among the available routes at lower wavelengths. This approach is referred to as the pure-adaptive approach. As is known a greedy method is any method that follows the problem solving heuristic of making the locally optimal choice at each stage with the hope of finding the global optimum. The functions in Equations (3) and (4) restrict the path length based on the current network load. Both of these approaches reduce the acceptable length of a route as the network load increases. Thus, at lower network load, both approaches behave like the pure-adaptive approach, and at higher network load, they behave like the shortest path approach. In Equation (3), the acceptable length of a route decreases linearly, which is referred to as the linear-load-adaptive approach, while in Equation (4), the acceptable length of a route decreases exponentially, which is referred to as the exponential-load-adaptive approach.

If the physical distance of the route is higher than $f(\rho, H_{sd})$, then the solution is rejected, and the minimum available wavelength slot w in the entire network is removed from all sets of wavelength slots $W_{ij}, \forall (i,j) \in E$. The process is repeated until either a route is found whose physical distance is less than $f(\rho, H_{sd})$ or all sets of wavelength slots $W_{ij}, \forall (i,j) \in E$ are empty.

The proposed method is also applicable to the RWSA and RWA problems with/without wavelength conversion.

In the pseudocode, it and done are iterators. PATH is a set of nodes along the route, and WL is a set of wavelengths along the route starting from which at least $x_{l_i}$ amount of spectrum is available.

Theorem 2: The tunable routing, wavelength assignment, and spectrum allocation heuristic is a polynomial-time method.

Proof. For the given wavelength convertible FWDM network G(V,E) and Y GHz of optical spectrum, if the spectrum is slotted by δ GHz, then the amount of time required to find wavelength slots starting from which $x_{l_i}$ amount of spectrum is available is $$O\left(\left\lceil \frac{Y}{\delta} \right\rceil \left\lceil \frac{x_{l_i}}{\delta} \right\rceil |E|\right).$$

The time required to construct an auxiliary graph G'(N,A) is O(|E|). After constructing an auxiliary graph the time required to solve the routing, wavelength assignment, and spectrum allocation subproblem using METHOD 2 above is O(|N|lg|N|+|A|). The procedure of constructing an auxiliary graph and solving the subproblems through METHOD 2 above is repeated $$\left\lceil \frac{Y}{\delta} \right\rceil$$

times in the worst case. Thus, the time complexity of the tunable routing, wavelength assignment, and spectrum allocation problem is $$O\left(\left\lceil \frac{Y}{\delta} \right\rceil \left(\left\lceil \frac{x_{l_i}}{\delta} \right\rceil |E| + |N|lg|N| + |A|\right)\right),$$

which is polynomial.

| METHOD 3: Update(—) |
| --- |
| comment: Update node parameters<br>$h_j \leftarrow h_u + 1$<br>$p_j \leftarrow u$<br>$a_j \leftarrow \{\min(w) | w \in W_{uj}\}$<br>$t_j \leftarrow \max\{t_u, \{\min(w) | w \in W_{uj}\}\}$ |

The preceding will now be further described with respect to FIG. 5. FIG. 5 is a flow diagram showing an exemplary method for tunable routing, wavelength assignment, and spectrum allocation in a WC-FWDM network, according to an embodiment of the present principles.

At step 501, the first wavelength slot w=1 is initialized and considered. At step 502, a search is performed on $$\left\lceil \frac{x_{l_i}}{\delta} \right\rceil$$

number of consecutive wavelength slots starting from the wavelength slot w on fiber (i, j). If $$\left\lceil \frac{x_{l_i}}{\delta} \right\rceil$$

consecutive wavelength slots are available, then the method proceeds to step 503. Otherwise, the method proceeds to step 504.

At step 503, wavelength slot w is included into the set of available wavelength slots $W_{ij}$. At step 504, wavelength slot w is not included into the set of available wavelength slots $W_{ij}$.

At step 505, it is verified whether all fibers $(i, j) \in E$ are checked for the availability of $$\left\lceil \frac{x_{l_i}}{\delta} \right\rceil$$

number of consecutive wavelength slots. If any fiber is still left for the consideration, then the method proceeds to step 506. Otherwise, the method proceeds to step 507.

At step 506, a fiber $(i, j) \in E$ is selected which is not yet taken into consideration and the method returns to step 502. At step 507, it is checked whether or not the wavelength slot w is available on every fiber (i, j,) i.e., $W_j$, $\forall (i,j) \in E$ or $$w = \left\lceil \frac{Y}{\delta} \right\rceil.$$

If it is available, then the method proceeds to step 509. Otherwise, the method proceeds to step 508.

At step 508, the index of the wavelength slot w is incremented, and the method returns to step 502. At step 509, a set of auxiliary nodes N is constructed from the set of optical nodes V, i.e., N=V.

At step 510, the number of available wavelength slots on a fiber (i, j) is checked, i.e., $|W_{i,j}| > 0$. If at least one wavelength slot is available, then the method proceeds to step 511. Otherwise, the method proceeds to step 512.

At step 511, an auxiliary link (i, j) in G'(N, A) is established between auxiliary nodes i and j. At step 512, no auxiliary link is established between auxiliary nodes i and j in G'(N, A).

At step 513, it is checked whether the set of available wavelength slots for each fiber $(i,j) \in E$ is considered. If any fiber is still left, then the method proceeds to step 514. Otherwise, the method proceeds to step 515.

At step 514, a fiber $(i,j) \in E$ is selected which is not yet taken into account and the method returns to step 510. At step 515, the following are initialized: $p_i = \infty$, $a_i = \infty$, $t_i = 0$, $r_i = 0$, $h_i = \infty \forall i \in N$, $h_s = 0$, and $Q = \emptyset$.

At step 516, a node u is found from the set N−Q which has the minimum $h_u$ value, and this node is added into set Q. In case of conflicts (e.g., ties), a node is selected that has the minimum $r_u$. If $h_u$ and $r_u$ are the same, then a node that has the minimum $t_u$ is selected.

At step 517, the neighboring node of the node u which does not exist in set Q is found, i.e., $j \in Adj(u) - Q$. At step 518, it is checked whether or not the found node u is the source node, i.e., u=s. If u is the source node, then the method proceeds to step 519. Otherwise, the method proceeds to step 521.

At step 519, it is checked whether the distance to neighboring node j from the source node s routed directly from node s is less than the distance to neighboring node j from the source node s routed through any other node, i.e., $h_u + 1 < h_j$. If the distance routed directly from node s is less than that of routed through any other node, then the method proceeds to step 520. Otherwise, the method returns to step 517.

At step 520, the following are updated, with the method thereafter proceeding step 539: the distance of node j, $h_j$, to $h_u+1$; predecessor node $p_j$ to u; the number required wavelength converters $r_j$ to 0; wavelength at the input port $a_j$ to the minimum wavelength slot in the set of available wavelength slots $W_{uj}$; maximum wavelength along the route $t_j$ to the maximum of $t_u$; and the minimum wavelength slot into the set of available wavelength slots $W_{uj}$.

At step 521, if node u is an intermediate node, then this step checks the requirement of the wavelength continuity between the wavelength at the input port of a node u, $a_u$, and the minimum wavelength in the set of available wavelength slots $W_{uj}$. If the wavelength continuity is satisfied, then the method proceeds to step 522. Otherwise, the method proceeds to step 530.

At step 522, it is checked whether the distance to neighboring node j from the source node s routed through node u is less than the distance to neighboring node j from the source node s routed through any other node, i.e., $h_u+1 < h_j$. If the distance routed through node u is less than that of routed through any other node, then the method proceeds to step 523. Otherwise, the method proceeds to step 524.

At step 523, the following are updated, with the method thereafter proceeding to step 539: distance of node j, $h_j$, to $h_u+1$; predecessor node $p_j$ to u; the number required wavelength converters $r_j$ to $r_u$; wavelength at the input port $a_j$ to the minimum wavelength slot in the set of available wavelength slots $W_{uj}$; maximum wavelength along the route $t_j$ to the maximum of $t_u$; and the minimum wavelength slot into the set of available wavelength slots $W_{uj}$.

At step 524, it is checked whether the distance to neighboring node j from the source node s routed through node u is the same as the distance to neighboring node j from the source node s routed through any other node, i.e., $h_u+1 = h_j$. If the distance routed through node u is the same as that of routed through any other node, then the procedure follows step 525. Otherwise, the method returns to step 517.

At step 525, it is checked whether the number of required converters on the route from the source node s to neighboring node j routed through node u is less than the number of required converters on the route from the source node s to neighboring node j routed through any other node, i.e., $r_u < r_j$. If the number of required converters on the route through node u is less than that on the route through any other node, then the method proceeds to step 526. Otherwise, the method proceeds to step 527.

At step 526, the following are updated, with the method thereafter proceeding to step 539: the distance of node j, $h_j$, to $h_u+1$; predecessor node $p_j$ to u; the number required wavelength converters $r_j$ to $r_u$; wavelength at the input port $a_j$ to the minimum wavelength slot in the set of available wavelength slots $W_{uj}$; maximum wavelength along the route $t_j$ to the maximum of $t_u$; and the minimum wavelength slot into the set of available wavelength slots $W_{uj}$.

At step 527, it is checked whether the number of required converters on the route from the source node s to neighboring node j routed through node u is the same as the number of converters on the route from the source node s to neighboring node j routed through any other node, i.e., $r_u = r_j$. If the number of required converters on the route through node u is the same as that on the route through any other node, then the method proceeds to step 528. Otherwise, the method returns to step 517.

At step 528, it is checked whether the maximum wavelength on the route from the source node s to neighboring node j routed through node u is less than that on the route from the source node s to neighboring node j routed through any other node, i.e., $\max(t_u, \{\min(w) | w \in W_{uj}\}) < t_j$. If the maximum wavelength on the route through node u is less than that on the route through any other node, then the method proceeds to step 529. Otherwise, the method returns to step 517.

At step 529, the following are updated, with the method thereafter proceeding to step 539: the distance of node j, $h_j$, to $h_u+1$; predecessor node $p_j$ to u; the number required wavelength converters $r_j$ to $r_u$; wavelength at the input port $a_j$ to the minimum wavelength slot in the set of available wavelength slots $W_{uj}$; maximum wavelength along the route $t_j$ to the maximum of $t_u$; and the minimum wavelength slot into the set of available wavelength slots $W_{uj}$.

At step 530, if node u is an intermediate node and the requirement of wavelength continuity is not satisfied between wavelengths at input and output ports of node u, then it is checked whether there is a wavelength converter at node u and the wavelength at the input port is convertible to the wavelength at the output port. i.e., $a_u - M \leq \{\min(w) | w \in W_{uj}\} \leq a_u + M$ and $C_i > 0$. If there is a wavelength converter at node u and input wavelength is convertible to the output wavelength, then the method proceeds to step 531. Otherwise, the method returns to step 517.

At step 531, it is checked whether the distance to neighboring node j from the source node s routed through node u is less than the distance to neighboring node j from the source node s routed through any other node, i.e., $h_u+1 < h_j$. If the distance routed through node u is less than that of routed through any other node, then the method proceeds to step 532. Otherwise, the method proceeds to step 533.

At step 532, the following are updated, with the method thereafter proceeding to step 539: the distance of node j, $h_j$, to $h_u+1$; predecessor node $p_j$ to u; the number required wavelength converters $r_j$ to $r_u+1$; wavelength at the input port $a_j$ to the minimum wavelength slot in the set of available wavelength slots $W_{uj}$; maximum wavelength along the route $t_j$ to the maximum of $t_u$; and the minimum wavelength slot into the set of available wavelength slots $W_{uj}$.

At step 533, it is checked whether the distance to neighboring node j from the source node s routed through node u is the same as the distance to neighboring node j from the source node s routed through any other node, i.e., $h_u+1 = h_j$. If the distance routed through node u is the same as that of routed through any other node, then the method proceeds to step 534. Otherwise, the method returns to step 517.

At step 534, it is checked whether the number of required converters on the route from the source node s to neighboring node j routed through node u is less than the number of converters on the route from the source node s to neighboring node j routed through any other node, i.e., $r_u < r_j$. If the number of required converters on the route through node u is less than that on the route through any other node, then the method proceeds to step 535. Otherwise, the method proceeds to step 536.

At step 535, the following are updated, with the method thereafter proceeding to step 539: the distance of node j, $h_j$, to $h_u+1$; predecessor node $p_j$ to u; the number required wavelength converters $r_j$ to $r_u+1$; wavelength at the input port $a_j$ to the minimum wavelength slot in the set of available wavelength slots $W_{uj}$; maximum wavelength along the route $t_j$ to the maximum of $t_u$; and the minimum wavelength slot into the set of available wavelength slots $W_{uj}$.

At step 536, it is checked whether the number of required converters on the route from the source node s to neighboring node j routed through node u is the same as the number of converters on the route from the source node s to neighboring node j routed through any other node, i.e., $r_u = r_j$. If the number of required converters on the route through node u is the same as that on the route through any other node, then the method proceeds to step 537. Otherwise, the method returns to step 517.

At step 537, it is checked whether the maximum wavelength on the route from the source node s to neighboring node j routed through node u is less than that on the route from the source node s to neighboring node j routed through any other node, i.e., $\max(t_u, \{\min(w) | w \in W_{uj}\}) < t_j$. If the maximum wavelength on the route through node u is less than that on the route through any other node, then the method proceeds to step 538. Otherwise, the method returns to step 517.

At step 538, the following are updated, with the method thereafter proceeding to step 539: the distance of node j, $h_j$, to $h_u+1$; predecessor node $p_j$ to u; the number required wavelength converters $r_j$ to $r_u+1$; wavelength at the input port $a_j$ to the minimum wavelength slot in the set of available wavelength slots $W_{uj}$; maximum wavelength along the route $t_j$ to the maximum of $t_u$; and the minimum wavelength slot into the set of available wavelength slots $W_{uj}$.

At step 539, it is checked whether all neighboring nodes are taken into consideration, i.e., $j \in \mathrm{Adj}(u) - Q$. If so, then the method proceeds to step 541. Otherwise, the method proceeds to step 540.

At step 540, a neighboring node is selected from the set N–Q which is not yet considered, and the method returns to step 517.

At step 541, it is checked whether all nodes in set N–Q are covered. If the set N–Q includes at least one node, then the method proceeds to step 516. Otherwise, the method proceeds to step 542.

At step 542, the destination node is selected, i.e., initialize u=d. At step 543, the selected node is added in set PATH (i.e., $\mathrm{PATH} \leftarrow \mathrm{PATH} \cup \{p_u\}$) and the wavelength at the input port of the selected node $a_u$ is added in set WL (i.e., $\mathrm{WL} \leftarrow \mathrm{WL} \cup \{a_u\}$). Finally, the predecessor of the selected node $p_u$ is chosen (i.e., $u = p_u$).

At step 544, it is checked whether the selected node is infinite, i.e, $u = \infty$. If the node is infinite, then the procedure follows the step 545, otherwise the procedure follows step 543.

At step 545, after obtaining the routing and wavelength assignment information in PATH and WL sets, this step checks whether the physical distance traveled by a channel is less than or equal to $f(\rho, H_{sd})$, while satisfying the constraints of Equations (1)-(4). If the distance is smaller or equal to $f(\rho, H_{sd})$, then the method proceeds to step 547. Otherwise, the method proceeds to step 546.

At step 546, the lowest wavelength slot w among all available wavelength slots $W_{ij}$, $\forall (i,j) \in E$ in the network is removed from all sets of available wavelength slots $W_{ij}$.

At step 547, if the distance is smaller than $f(\rho, H_{sd})$, then the found routing (PATH) and wavelength assignment (WL) and spectrum allocation $$\left( \left\lceil \frac{x_{l_i}}{\delta} \right\rceil \right)$$

information is returned.

At step 548, after removing the lowest available wavelength slot w from all sets of wavelength slots $W_{ij}$, this step checks whether all sets of wavelength slots are empty, i.e., $W_{ij'} = \emptyset, \forall (i, j)$. If all sets $W_{ij}$ are empty, then the method proceeds to step 549. Otherwise, the method proceeds to step 510.

At step 549, since no path is available, this step blocks the channel.

It is to be appreciated that the present principles provide many advantages over the prior art. Some of these advantages will now be described. One such advantage is that the tunable routing feature optimizes the network performance over various network load scenarios. Additionally, the proposed procedure reduces the channel blocking probability compared to the RWA-WC procedures in fixed-grid WDM networks. Moreover, the proposed procedure reduces the channel blocking probability compared to the RWSA procedures in FWDM networks. Also, the proposed procedure increases the traffic carrying capacity of networks. Further, the time required in finding the route, operating wavelength and spectrum on each fiber along the route of a channel through the proposed procedure is quick.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method in a wavelength convertible flexible optical wavelength-division multiplexing (WC-FWDM) network having a plurality of optical nodes interconnected by a plurality of optical fibers, the network for providing an overall spectrum divisible into a set of consecutive wavelength slots, at least one of the plurality of optical nodes having at least one wavelength converter for wavelength conversion, the method comprising:

determining a channel route through the network commencing at a source node and ceasing at a destination node, the channel route being selectively tunable responsive to selected ones of a plurality of routing methods, wherein the selected ones of the plurality of routing methods are so selected responsive to a routing policy having one or more objectives of minimization of a blocking of one of more channels in the set, minimization of a number of wavelength converters used in the network, minimization of physical distance traversed by a channel between a source node and a destination node, and minimization of operating wavelengths of a channel, wherein the channel route being selectively tunable comprises determining a set of input ports $a_j$ from the relationship $a_j = \{\min(w) | w \in W_{uj}\}$, where j and u denote nodes, w denotes a wavelength slot, and $W_{uj}$ denotes a set of available wavelength slots at nodes u and j.

2. The method of claim 1, wherein the plurality of routing methods comprise two or more of a pure-adaptive routing method, a linear load-adaptive routing method, an exponential load-adaptive routing method, and a shortest routing method.

3. The method of claim 2, wherein the linear load-adaptive routing method and the exponential load-adaptive routing method tune an allowable physical distance of the channel route through the network responsive to a current network load, the linear load-adaptive routing method and the exponential load-adaptive routing method respectively linearly and exponentially decreasing the allowable physical distance travelled by the channel as the current network load increases.

4. The method of claim 2, wherein the pure-adaptive routing method greedily selects a shortest available channel route on which is available at least a minimum threshold amount of the overall spectrum.

5. The method of claim 2, wherein the pure-adaptive routing method greedily selects a shortest available channel route on which is available at least a minimum threshold amount of the overall spectrum and on which is available at least a minimum threshold number of wavelength converters in the case of a violation of a wavelength continuity constraint, the wavelength continuity constraint comprising a requirement of having a same operating wavelength on all optical fibers along the route of a given channel.

6. The method of claim 1, wherein plural route ties between multiple candidate channel routes resulting from one or more of the plurality of routing methods are resolved by selecting, from among the multiple candidate channel routes, a particular channel route on which a number of fibers along the route, from among the plurality of fibers, is minimized.

7. The method of claim 6, wherein further plural route ties existing between any two or more of the multiple candidate channel routes that each minimize to a same degree the number of fibers along the route are resolved by selecting a given channel route on which a number of employed wavelength converters is minimized.

8. The method of claim 7, wherein yet further plural route ties existing between any two or more of the multiple candidate channel routes that each minimize to the same degree the number of employed wavelength converters are resolved by selecting a respective channel route on which maximum used wavelength is minimized.

9. The method of claim 2, wherein the linear load-adaptive routing method and the exponential load-adaptive routing method are without consideration of a physical distance of a channel route so as to minimize spectral gaps between channels in the network when a current network load is below a given load threshold, and wherein the linear load-adaptive routing method and the exponential load-adaptive routing method consider and decrease the route physical distance so as to minimize an occurrence of channel blocking in the network when the current network load is at or above the given load threshold.

10. A method in a wavelength convertible flexible optical wavelength-division multiplexing (WC-FWDM) network having a plurality of optical nodes interconnected by a plurality of optical fibers, the network for providing an overall spectrum divisible into a set of consecutive wavelength slots, at least one of the plurality of optical nodes having at least one wavelength converter for wavelength conversion, the method comprising:

determining a channel route through the network commencing at a source node and ceasing at a destination node, the channel route being selectively tunable responsive to selected ones of a plurality of routing methods, wherein the selected ones of the plurality of routing methods are so selected responsive to a routing policy having one or more objectives of minimization of a blocking of one of more channels in the set, minimization of a number of wavelength converters used in the network, minimization of physical distance traversed by a channel between a source node and a destination node, and minimization of operating wavelengths of a channel;

wherein a channel route length $f(\rho, H_{sd})$ satisfies $f(\rho, H_{sd})= H_{sd}$; $f(\rho, H_{sd})=H_{sd}+\infty$; $f(\rho, H_{sd})=H_{sd}((1-\rho)\times H_{sd})$; $f(\rho, Hsd)=H_{sd}+(10^{-}\times H_{sd})$; where $H_{sd}$ denotes the shortest physical distance between source and destination nodes and $\rho$ denotes network load.

* * * * *